US011623302B2

(12) United States Patent
Wehrendt

(10) Patent No.: US 11,623,302 B2
(45) Date of Patent: *Apr. 11, 2023

(54) LASER TOOL HAVING A HOLLOW SHAFT DRIVE AND NON-ROTATING LENS; METHOD FOR SETTING THE FOCAL POSITION OF THE LASER BEAMS IN A LASER TOOL

(71) Applicant: Volkswagen Aktiengesellschaft, Wolfsburg (DE)

(72) Inventor: Christian Wehrendt, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 243 days.

This patent is subject to a terminal disclaimer.

(21) Appl. No.: 16/504,018

(22) Filed: Jul. 5, 2019

(65) Prior Publication Data

US 2019/0329352 A1 Oct. 31, 2019

Related U.S. Application Data

(63) Continuation of application No. PCT/EP2017/073188, filed on Sep. 14, 2017.

(30) Foreign Application Priority Data

Jan. 5, 2017 (DE) ..................... 10 2017 200 080.5

(51) Int. Cl.
*B23K 26/10* (2006.01)
*B23K 26/352* (2014.01)
(Continued)

(52) U.S. Cl.
CPC ........ *B23K 26/106* (2013.01); *B23K 26/0643* (2013.01); *B23K 26/0648* (2013.01);
(Continued)

(58) Field of Classification Search
CPC .............. B23K 26/106; B23K 26/0643; B23K 26/0648; B23K 26/0652; B23K 26/352; B23K 26/355
See application file for complete search history.

(56) References Cited

U.S. PATENT DOCUMENTS 4,839,495 A 6/1989 Kitera et al.
5,332,881 A * 7/1994 Topkaya ............... B23K 26/142
219/121.75
(Continued)

FOREIGN PATENT DOCUMENTS

CN 204934884 U 1/2016
DE 29506005 * 1/1995
(Continued)

OTHER PUBLICATIONS

RW article (Year: 2014).*
(Continued)

*Primary Examiner* — Justin C Dodson
*Assistant Examiner* — Fahmida Ferdousi
(74) *Attorney, Agent, or Firm* — Muncy, Geissler, Olds & Lowe, P.C.

(57) ABSTRACT

A laser tool, in particular for the structuring of cylinder running surfaces, that offers the possibility of guiding the laser beam of the laser tool with high process reliability, it is provided that the laser tool has a laser source for producing laser beams that are passed through a lens tube located in a hollow shaft, wherein a lens through which the laser beams are passed is attached to the lens tube, wherein the hollow shaft is designed to be rotatable as a hollow-shaft motor, wherein a spindle, to which is attached an optical device for deflecting the laser beam onto a workpiece surface, is attached to the hollow shaft, wherein the hollow shaft is rotatable independently of the lens.

15 Claims, 1 Drawing Sheet

(51) Int. Cl.
*B23K 26/06* (2014.01)
*B23K 26/08* (2014.01)

(52) U.S. Cl.
CPC ...... *B23K 26/0652* (2013.01); *B23K 26/0823* (2013.01); *B23K 26/352* (2015.10); *B23K 26/355* (2018.08)

(56) References Cited

U.S. PATENT DOCUMENTS

| | | | | |
|---|---|---|---|---|
| 7,564,006 | B2 * | 7/2009 | Schwob | B23K 26/064 219/121.75 |
| 8,404,994 | B2 | 3/2013 | Spennemann et al. | |
| 8,752,302 | B2 * | 6/2014 | Schmid | B23K 26/1482 33/263 |
| 2010/0072180 | A1 | 3/2010 | Schuermann et al. | |
| 2013/0200052 | A1 * | 8/2013 | Wittwer | B23K 26/0876 219/121.75 |
| 2014/0216648 | A1 | 8/2014 | Geiger et al. | |
| 2016/0339541 | A1 | 11/2016 | Spoerl et al. | |

FOREIGN PATENT DOCUMENTS

| | | | | |
|---|---|---|---|---|
| DE | 29506005 | * | 4/1995 | |
| DE | 29506005 | U1 | 8/1996 | |
| DE | 19809367 | A1 | 9/1999 | |
| DE | 19809367 | A1 * | 9/1999 | ......... B23K 26/0006 |
| DE | 202005016574 | U1 | 2/2007 | |
| DE | 10 2007 035 717 | A1 | 7/2008 | |
| DE | 102008015403 | A1 | 9/2009 | |
| DE | 102008015403 | A1 * | 9/2009 | ............ B23K 26/04 |
| DE | 102011081554 | A1 | 2/2013 | |
| EP | 0300458 | A1 | 1/1989 | |
| EP | 1716963 | A1 | 11/2006 | |
| JP | S5838689 | A | 3/1983 | |
| JP | S6163387 | A | 4/1986 | |
| JP | H0381721 | A | 4/1991 | |
| JP | 2003191086 | A * | 7/2003 | |
| JP | 2010036240 | A | 2/2010 | |
| JP | 2012024781 | A | 2/2012 | |
| JP | 2012086903 | A | 5/2012 | |
| KR | 20120126787 | A | 11/2012 | |
| WO | WO-2005053896 | A1 * | 6/2005 | ........... B23K 26/282 |

OTHER PUBLICATIONS

GlobalSpec (Year: 2015).*
International Search Report dated Jan. 10, 2018 in corresponding application PCT/EP2017/073188.
International Search Report dated Mar. 5, 2018 in co-pending application PCT/EP2017/078771.
International Preliminary Report on Patentability dated Jul. 9, 2019 in corresponding application PCT/EP2017/073188.
U.S. Appl. No. 16/503,934, filed Jul. 5, 2019.

* cited by examiner

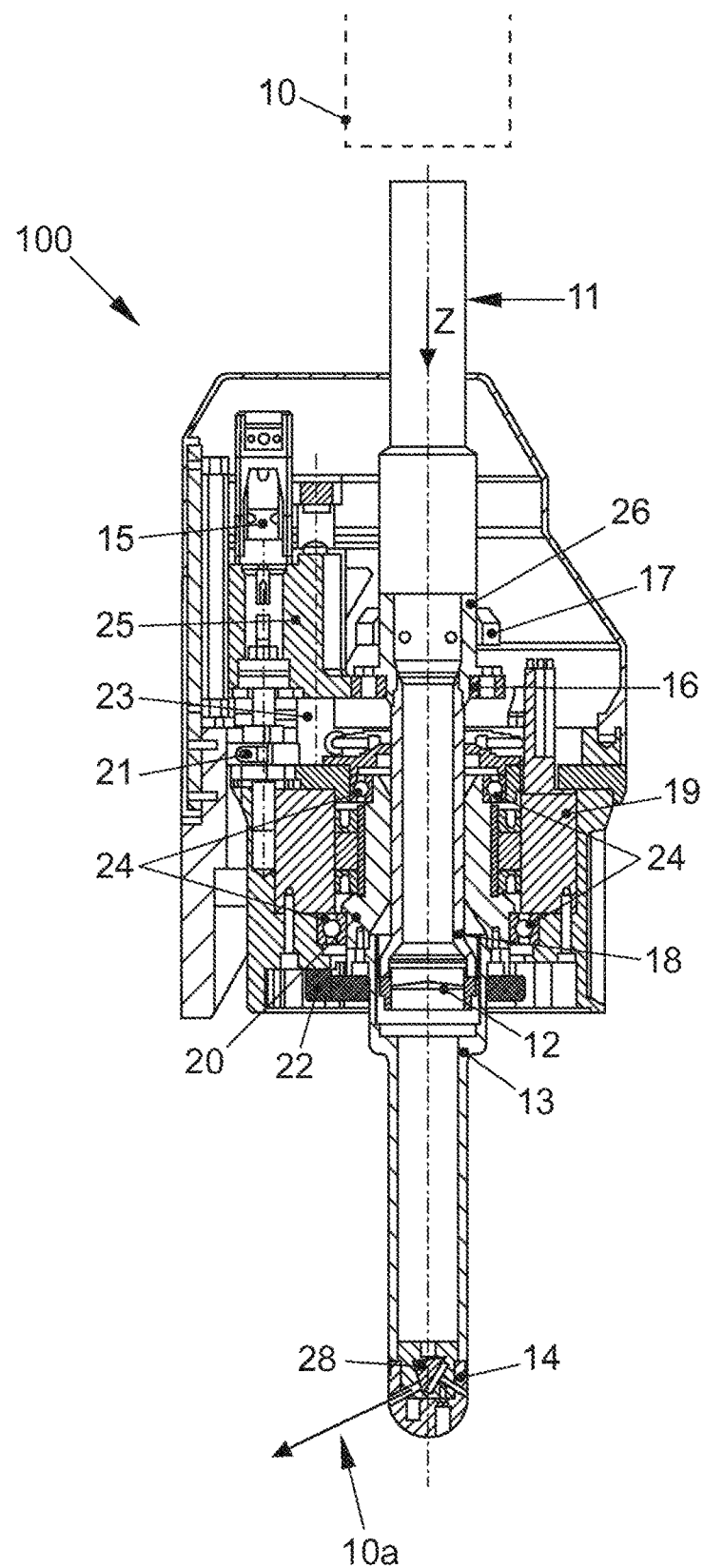

LASER TOOL HAVING A HOLLOW SHAFT DRIVE AND NON-ROTATING LENS; METHOD FOR SETTING THE FOCAL POSITION OF THE LASER BEAMS IN A LASER TOOL

This nonprovisional application is a continuation of International Application No. PCT/EP2017/073188, which was filed on Sep. 14, 2017, and which claims priority to German Patent Application No. 10 2017 200 080.5, which was filed in Germany on Jan. 5, 2017, and which are both herein incorporated by reference.

BACKGROUND OF THE INVENTION

Field of the Invention

The present invention relates to a laser tool, in particular for the structuring of cylinder running surfaces, having a fixed lens and a spindle that is driven by means of a hollow-shaft drive and rotatable independently of the lens, and also relates to a method for adjusting the focal position of laser beams in a laser tool.

Description of the Background Art

Laser tools are used in automotive engineering for processing and for structuring of workpiece surfaces. In particular, laser tools are employed in introducing small structures on cylinder running surfaces. In laser tools known from the prior art, a laser beam generated in a laser source is guided onto the material surface through a series of optical elements, wherein the laser beam is rotated by a rotatable device. In this process, the correct position of the focus of the laser beam is crucial for an optimal processing result, which position should be as precisely and reproducibly settable as possible. In this context, the focal position is influenced by the guidance of the laser beam in the optical elements of the laser tool, which should be positioned as precisely as possible in the beam path. In particular, it is advantageous in this regard when the optical components are movable independently of the spindle.

Known from DE 10 2008 015 403 A1 is a laser beam tool for finishing an inner surface of a workpiece hole, in particular a cylinder running surface, wherein the laser beam tool is attached to a hollow machine spindle that can rotate and, in particular, be raised and lowered, and wherein an optical device for deflecting the laser beam onto the workpiece surface is adjustable relative to the machine spindle so that the laser beam can be moved independently of the motion of the machine spindle. In this design, provision is made in particular that a rotary motion of the optical device that is opposite the rotary motions of the machine spindle can be superimposed with the aid of the adjusting device. The intent of this design is to extend interaction times between the laser beam and the material surface to be processed so that the incorporation of free structures is made possible.

SUMMARY OF THE INVENTION

It is therefore an object of the present invention to provide a laser tool that offers the possibility of guiding the laser beam of a laser tool with high process reliability.

In an exemplary embodiment, a laser tool is provided, in particular for the structuring of cylinder running surfaces, that has a laser source for producing laser beams that are passed through a lens tube located in a hollow shaft, wherein a lens through which the laser beams are passed is attached to the lens tube, wherein the hollow shaft is designed to be rotatable as a hollow-shaft motor, wherein a spindle, to which is attached an optical device for deflecting the laser beams onto a workpiece surface, is attached to the hollow shaft, wherein the hollow shaft is rotatable independently of the lens.

As a result of the fact that the lens is not attached to the spindle or to the hollow shaft, and consequently does not follow the rotation thereof, process reliability is improved so that a displacement of the laser focus caused by the rotation of the lens is avoided. For this purpose, the lens is advantageously arranged in the hollow shaft so that the hollow shaft can rotate about the lens.

The laser tool can have a collimator that is located after the laser source in the beam path and that is movable parallel to the laser beam by means of a drive.

As a result of the movement of the collimator with the aid of a drive along the direction of the laser beam, it is possible in an advantageous way to adjust the position of the focus of the laser beam without the manual intervention of an operator being required. Moreover, the collimator is guided in the beam path in a stable manner.

The drive can be an electric drive, a pneumatic drive, or a hydraulic drive. Especially preferably, the drive is a servomotor.

The lens can be attached to the lens tube, wherein the lens tube is attached to the collimator. As a result, the lens, the lens tube, and the collimator form a unit that can be moved parallel to the laser beam by means of the drive, and that thus serves to set the focal position of the laser beam. As a result of the fact that the collimator and the lens are fixed with respect to one another in this arrangement, the laser beam guidance is optimized and more accurate positioning of the laser focus is made possible.

The drive can have a linear measuring system as an external position sensor for detecting the position of the collimator. The movement of the collimator parallel to the direction of the laser beam can be accomplished by means of a ball-screw drive, for example. The linear measuring system is connected to the drive or is integrated into the drive.

The drive can have a control device for controlling the movement of the collimator. It is consequently possible to control the movement of the collimator on the basis of at least one predefinable parameter. In addition, the control device processes the signals of the linear measuring system.

The process reliability and the repeatability are advantageously increased as a result of the fact that the movement of the collimator is controlled through predefinable parameters. Furthermore, the focal position can be set especially precisely for different cylinder diameters. In particular, it is possible to store the parameters for different cylinder diameters in a memory provided in the controller so that they can be retrieved directly during operation without manual changeover.

The at least one parameter can be the feed of the collimator toward the optical device or the feed of the collimator toward the laser source. In this context, a feed of the collimator toward the optical device can mean an advancing of the focus toward the material surface, and analogously, a feed of the collimator toward the laser source can mean a moving of the focus away from the workpiece surface.

The laser tool can have at least a lower stop that delimits the movement of the collimator in the direction of the optical device. In addition, provision is made according to another embodiment that the laser tool has at least an upper stop that delimits the movement of the collimator in the direction of the laser source.

The optical device can be a reflecting prism or a mirror. This is attached to an end of the spindle facing away from the laser source, and thus rotates with the spindle in order to travel the material surface by means of the rotation. The reflecting prism or the mirror is fastened by means of multiple screws in a holder that is attached to the spindle. However, other optical elements that are designed for deflecting a laser beam, for example a mirror, are also possible.

The laser tool can have a control unit that controls the motion of the collimator as a function of a signal from a sensor. A sensor of this nature could measure the intensity of the laser spot and compare it with a target value or a threshold, for example. When such a target value or threshold is exceeded or fallen below, the drive automatically readjusts the position of the collimator, and thus the location of the laser beam focus. This has the consequence that the surface has a better surface structure according to the preselected parameters. Moreover, the cost effectiveness of the system rises, since the intensity of the laser source can be adapted to the environmental influences and the system is calibrated continuously.

In addition, the invention relates to a method for setting the focal position of laser beams in a laser tool according to the present invention. The laser tool has a laser source for producing laser beams and a collimator for producing a parallel course of the laser beams. The laser beam is passed through a lens, wherein the lens is arranged inside a rotatable spindle. The laser beam is then passed through an optical device that is located at an end of the spindle facing away from the laser source and that deflects the laser beams onto a material surface. The collimator is movable parallel to the laser beam by means of a drive, and at least one parameter is predefined by means of a controller that controls the motion of the collimator, wherein the collimator is moved in the direction of the optical device or opposite to the direction of the optical device as a function of the at least one parameter.

The at least one parameter can be the feed of the collimator toward the optical device or the feed of the collimator toward the laser source.

The lens can be arranged to be stationary in a lens tube that is attached to the collimator, so the lens follows the motion of the collimator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the sole figure illustrates a cross-sectional representation of the laser tool.

DETAILED DESCRIPTION

The figure shows the laser tool (100) in a cross-sectional representation. The fiber of the laser source (10) is connected to the laser tool (100) by the collimator (11). The collimator (11) is attached to a stationary sleeve (26), which is connected to the drive (15) by an adjustment angle (25). The drive (15) travels along a guide shaft (23) by means of a recirculating ball screw (21). Also attached to the sleeve (26) is a lens tube (18); attached to the end of the lens tube that faces away from the sleeve (26) is the lens (12). The optical path of the laser beam (10a) from the laser source (10) extends in this design through the collimator (11), the sleeve (26), the lens tube (18), and the lens (12) to an optical device (14).

The unit includes a laser source (10), collimator (11), sleeve (26), lens tube (18), and lens (12) is connected to the drive (15) by the adjustment angle (25), and can thus be moved as a unit parallel to the laser beam. The movement of this focusing unit is delimited by an upper stop (17) and a lower stop (16).

The laser tool (100) additionally has a control device for controlling the motion of the collimator (11). In order to control the motion of the collimator (11), one or more parameters can be specified, thus for instance, the feed of the collimator (11) in the direction of the optical device (14) or the feed of the collimator in the direction of the laser source (10) can be specified. In addition, the laser tool (100) has a control unit that is not shown in detail that controls the motion of the collimator (11), and thus the focal position, as a function of a signal which originates from a sensor, for example, in the process and calibrates the system with regard to the focal position.

For rotation of the laser beam, the laser tool (100) has a spindle (13), which is attached to the hollow shaft (20) of a hollow-shaft motor (19) and is driven by this hollow-shaft motor (19). In this design, the lens tube (18) and the lens (12) are arranged inside the hollow shaft (20). All components of the hollow-shaft motor (19) are supported by bearings (24).

The optical device (14) is attached to the end of the spindle (13) that faces away from the hollow-shaft motor (19). The optical device (14) rotates together with the spindle (13). The optical device (14) includes a reflecting prism (28), which deflects the laser beam (10a) onto the workpiece surface (30). Also arranged in the vicinity of the spindle is a sensor (22), which checks the position of the spindle, and thus of the laser beam (10a).

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. A laser tool for the structuring of cylinder running surfaces, the laser tool comprising:
a laser source that produces a laser beam that is passed through a lens tube located in a hollow shaft, the hollow shaft being rotatable by a hollow-shaft motor and the hollow shaft having a first end facing towards the laser source and a second end that opposes the first end and faces away from the laser source;
a lens through which the laser beam is passed is attached to the lens tube;
a spindle having a first end facing towards the laser source and a second end that opposes the first end and faces away from the laser source, the first end of the spindle being attached to the second end of the hollow shaft and the second end of the spindle having an optical device attached thereto, the optical device provided to deflect the laser beam onto a workpiece surface, a collimator that is movable in a direction parallel to the laser beam via a drive, the collimator having a cylindrical outer surface, and a sleeve, the sleeve having a first end facing towards the laser source and being attached to the collimator and the sleeve having a second end that opposes the first end and faces away from the laser source, wherein the second end of the sleeve is directly attached to and covers a part of an outer surface of the lens tube, wherein in a direction of a beam path of the laser beam, the collimator is located downstream of the laser source and upstream of the lens tube, and the second end of the sleeve is located downstream of the laser source and upstream of both the first end of the hollow shaft and the first end of the spindle, wherein the hollow shaft is rotatable independently of the lens, and wherein due to the attachment of the sleeve to both the collimator and the lens tube, the collimator, the sleeve and the lens tube are simultaneously movable in a direction parallel to the laser beam.

2. The laser tool according to claim 1, wherein the drive is an electric drive, a servomotor, a hydraulic drive, or a pneumatic drive.

3. The laser tool according to claim 1, wherein the collimator is connected to the lens tube.

4. The laser tool according to claim 1, wherein the drive has a sensor.

5. The laser tool according to claim 4, wherein the movement of the collimator is based on a signal from the sensor.

6. The laser tool according to claim 1, wherein the movement of the collimator is based on at least one predefinable parameter.

7. The laser tool according to claim 6, wherein the at least one predefinable parameter is a feed of the collimator toward the optical device or a feed of the collimator toward the laser source.

8. The laser tool according to claim 1, wherein the laser tool has a lower stop and an upper stop each having a surface that delimit a length of a movement path of the collimator in the direction parallel to the laser beam.

9. The laser tool according to claim 8, wherein the sleeve has a radially extending protrusion that is positioned between the surface of the lower stop and the surface of the upper stop, such that depending upon an upward or downward movement of the sleeve in the direction parallel to the laser beam, the radially extending protrusion will abut either the surface of the lower stop or the surface of the upper stop so as to delimit the length of the movement path of the collimator in the direction parallel to the laser beam.

10. The laser tool according to claim 1, wherein the optical device is a reflecting prism or a mirror.

11. A method for setting a focal position of a laser beam in a laser tool comprising a laser source for producing the laser beam and a collimator for producing a parallel course of the laser beam from the laser source, the collimator having a cylindrical outer surface and the laser beam passing through a lens attached to a lens tube, the method comprising:

arranging the lens inside a rotatable spindle, the rotatable spindle having a first end that faces towards the laser source and a second end that opposes the first end and faces away from the laser source;

deflecting, via an optical device, the laser beam onto a material surface, the optical device being attached to the second end of the rotatable spindle that faces away from the laser source;

moving the collimator in a direction parallel to the laser beam via a drive;

predefining at least one parameter via a controller that controls a motion of the collimator, wherein the collimator is moved in a direction toward the optical device or opposite to the direction toward the optical device as a function of the at least one parameter, wherein a hollow shaft is provided and has a first end facing towards the laser source and a second end that opposes the first end and faces away from the laser source, the lens tube being located in the hollow shaft, the hollow shaft being rotatable and the second end of the hollow shaft being attached to the first end of the rotatable spindle, wherein a sleeve is provided, the sleeve having a first end facing towards the laser source and being attached to the collimator and the sleeve having a second end that opposes the first end and faces away from the laser source, wherein the second end of the sleeve is directly attached to and covers a part of an outer surface of the lens tube, wherein due to the attachment of the sleeve to both the collimator and the lens tube, the collimator, the sleeve and the lens tube are simultaneously movable in the direction parallel to the laser beam, and wherein in a direction of a beam path of the laser beam, the collimator is located downstream of the laser source and upstream of the lens tube, and the second end of the sleeve is located downstream of the laser source and upstream of both the first end of the hollow shaft and the first end of the spindle.

12. The method according to claim 11, wherein the at least one parameter is a feed of the collimator toward the optical device or a feed of the collimator toward the laser source.

13. The method according to claim 11, wherein the lens is arranged in a fixed position in the lens tube and wherein the lens tube is attached to the collimator.

14. The method according to claim 11, wherein the movement of the collimator is based on a signal from a sensor.

15. The method according to claim 11, wherein the laser tool has a lower stop and an upper stop each having a surface that delimit a length of a movement path of the collimator in the direction parallel to the laser beam, and wherein the sleeve has a radially extending protrusion that is positioned between the surface of the lower stop and the surface of the upper stop, such that depending upon an upward or downward movement of the sleeve in the direction parallel to the laser beam, the radially extending protrusion will abut either the surface of the lower stop or the surface of the upper stop so as to delimit the length of the movement path of the collimator in the direction parallel to the laser beam.

\* \* \* \* \*